United States Patent
Golash et al.

(10) Patent No.: US 7,782,828 B2
(45) Date of Patent: Aug. 24, 2010

(54) METHOD AND SYSTEM FOR MANAGING CHANNELS IN A WIRELESS NETWORK

(75) Inventors: Rahul Golash, Hyderabad (IN); Rohit Shankar, Hyderabad (IN); Sumit B. Deshpande, Central Islip, NY (US); Navin Kumar Sharma, Bihar (IN); Rajesh Dharmalingam, Trichy (IN)

(73) Assignee: Computer Associates Think, Inc., Islandia, NY (US)

( * ) Notice: Subject to any disclaimer, the term of this patent is extended or adjusted under 35 U.S.C. 154(b) by 688 days.

(21) Appl. No.: 11/466,236

(22) Filed: Aug. 22, 2006

(65) Prior Publication Data

US 2008/0049666 A1 Feb. 28, 2008

(51) Int. Cl.
*H04W 4/00* (2009.01)

(52) U.S. Cl. .................................... 370/341

(58) Field of Classification Search ................ 370/229, 370/241.1, 245, 333, 338, 341, 455, 329, 370/330
See application file for complete search history.

(56) References Cited

U.S. PATENT DOCUMENTS

| | | | |
|---|---|---|---|
| 5,491,457 A | 2/1996 | Feher | |
| 5,784,402 A | 7/1998 | Feher | |
| 6,393,032 B1 | 5/2002 | Ikegami | |
| 6,445,749 B2 | 9/2002 | Feher | |
| 6,659,947 B1 | 12/2003 | Carter et al. | |
| 6,928,101 B2 | 8/2005 | Feher | |
| 6,985,465 B2 | 1/2006 | Cervello et al. | |
| 7,054,329 B2 | 5/2006 | Cervello et al. | |
| 7,295,524 B1 * | 11/2007 | Gray et al. | 370/254 |
| 7,376,099 B2 * | 5/2008 | Tseng et al. | 370/329 |
| 2001/0055297 A1 * | 12/2001 | Benveniste | 370/349 |
| 2002/0060995 A1 | 5/2002 | Cervello et al. | |
| 2002/0188723 A1 | 12/2002 | Choi et al. | |
| 2005/0220106 A1 * | 10/2005 | Raverdy et al. | 370/392 |
| 2006/0029023 A1 | 2/2006 | Cervello et al. | |
| 2006/0248556 A1 * | 11/2006 | Yuen et al. | 725/35 |
| 2008/0020702 A1 * | 1/2008 | Jendbro et al. | 455/3.01 |
| 2009/0253392 A1 * | 10/2009 | Colonna | 455/161.3 |
| 2009/0296647 A1 * | 12/2009 | Friday et al. | 370/329 |

* cited by examiner

*Primary Examiner*—Chirag G Shah
*Assistant Examiner*—Amarnauth Persaud
(74) *Attorney, Agent, or Firm*—Baker Botts L.L.P.

(57) ABSTRACT

According to one embodiment of the invention, a method for managing channels in a wireless network includes retrieving device parameters from a wireless network device communicating on a channel in the wireless network. The device parameters include a parameter indicative of a location of the wireless network device and a parameter indicative of the channel of the wireless network device. The channel is associated with a data transmission frequency. The method also includes generating a list of available channels for the wireless network device by determining a channel pattern in the wireless network. The method further includes specifying the channel on which the wireless network device should communicate based on the generated list of available channels to reduce channel interference to the wireless network device.

27 Claims, 2 Drawing Sheets

METHOD AND SYSTEM FOR MANAGING CHANNELS IN A WIRELESS NETWORK

TECHNICAL FIELD OF THE INVENTION

This invention relates generally to wireless networks, and more particularly, to a method and system for managing channels in a wireless network.

BACKGROUND OF THE INVENTION

Endpoint devices, such as laptops, may communicate with a wireless network through wireless network devices, such as access points. The wireless network devices and endpoint devices may communicate with each other over a fixed number of channels. As wireless networks grow in size and complexity, the augmentation of endpoint devices and wireless network devices may cause channel interference.

OVERVIEW OF EXAMPLE EMBODIMENTS

According to one embodiment of the invention, a method for managing channels in a wireless network includes retrieving device parameters from a wireless network device communicating on a channel in the wireless network. The device parameters include a parameter indicative of a location of the wireless network device and a parameter indicative of the channel of the wireless network device. The channel is associated with a data transmission frequency. The method also includes generating a list of available channels for the wireless network device by determining a channel pattern in the wireless network. The method further includes specifying the channel on which the wireless network device should communicate based on the generated list of available channels to reduce channel interference to the wireless network device.

Technical advantages of particular embodiments of the present invention include a method and system for managing channels in a wireless network that considers the location and channel of a wireless network device to determine a proper channel. Thus, wireless network devices avoid channels that overlap.

Another technical advantage of particular embodiments of the present invention includes a method and system for managing channels in a wireless network that automatically adjusts channel settings to reduce the effects of interference. Thus, interference from other wireless network devices may be reduced or eliminated.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which.

DESCRIPTION OF EXAMPLE EMBODIMENTS

Figure 3:
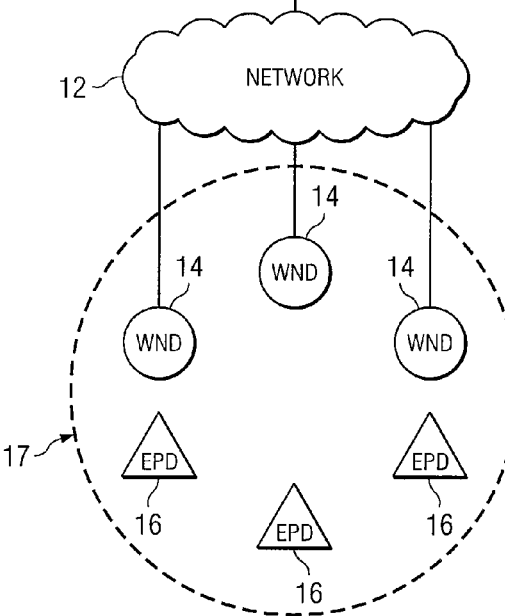
FIG. 3 is a flow chart illustrating example acts associated with a method for managing channels in a wireless network.
Figure 3:
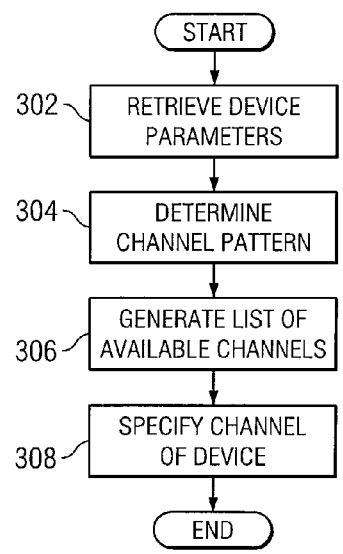

Embodiments of the present invention and its advantages are best understood by referring to FIGS. 1 through 3 of the drawings, like numerals being used for like and corresponding parts of the various drawings.

Figure 1A:
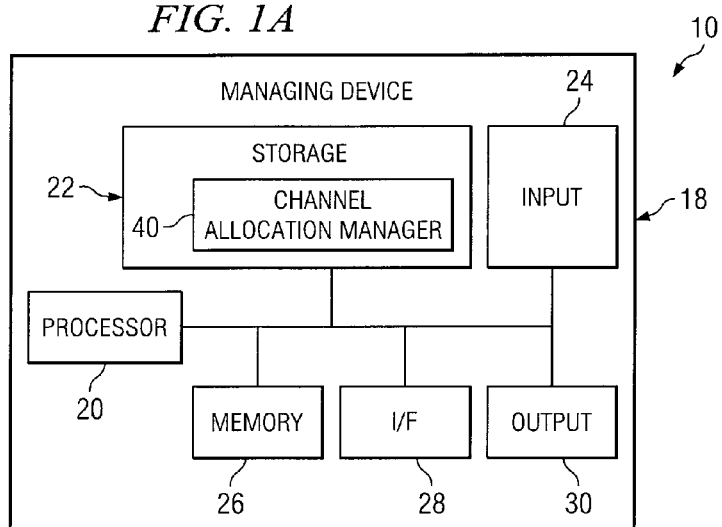
FIG. 1A is a block diagram illustrating a system for managing channels in a wireless network according to the teachings of the invention.

FIG. 1A is a block diagram illustrating a system 10 for managing channels in a wireless network according to the teachings of the invention. As shown in FIG. 1A, system 10 generally includes a network 12, one or more wireless network devices 14, one or more endpoint devices 16, a wireless network range 17, and a managing device 18. System 10 is particularly adapted for managing the communication channels of wireless network devices in a wireless network.

Network 12 may refer to any interconnecting system capable of transmitting audio, video, signals, data, messages, or any combination of the preceding. Network 12 may comprise all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, other suitable communication link, or any combination of the preceding.

In particular embodiments of the invention, network 12 may transmit information in packet flows. A packet flow includes one or more packets sent from a source to a destination. A packet may comprise a bundle of data organized in a specific way for transmission, and a frame may comprise the payload of one or more packets organized in a specific way for transmission. A packet-based communication protocol such as Internet Protocol (IP) may be used to communicate the packet flows.

Network 12 may utilize communication protocols and technologies to transmit packet flows. Example communication protocols and technologies include those set by the Institute of Electrical and Electronics Engineers, Inc. (IEEE) standards, International Telecommunications Union (ITU-T) standards, European Telecommunications Standards Institute (ETSI) standards, Internet Engineering Task Force (IETF) standards, or other standards. As an example, network 12 may utilize the IEEE 802.xx standards such as the 802.11 standards.

Wireless network device 14 may be any network point suitable to couple an endpoint device, such as endpoint device 16, to a network, such as network 12. Wireless network device 14 may be, for example, a session border controller, gatekeeper, call manager, conference bridge, router, hub, switch, gateway, access point, edge point, or any other hardware or software operable to couple an endpoint device, such as endpoint device 16, to a network.

According to one embodiment of the invention, wireless network device 14 may have a wired connection to network 12. According to another embodiment of the invention, wireless network device 14 may have a wireless connection to network 12. According to yet another embodiment of the invention, wireless network device 14 may include a receiver or transmitter or both a receiver and a transmitter. As an example, wireless network device 14 may include an omni directional antenna operable to communicate with one or more endpoint devices.

Endpoint device 16 may refer to any suitable device operable to communicate with network 12 through a wireless network device 14. Endpoint device 16 may execute with any of the well-known MS-DOS, PC-DOS, OS-2, MAC-OS, WINDOWS™, UNIX, or other appropriate operating systems, including future operating systems. Endpoint device 16 may include, for example, a personal digital assistant, a computer such as a laptop, a cellular telephone, a mobile handset, or any other device operable to communicate with network 12 through wireless network device 14.

Wireless network range 17 may refer to any suitable signal range for communications between wireless network device 14 and endpoint device 16. In particular embodiments of the invention, communications between wireless network device 14 and endpoint device 16 are communicated in wireless network range 17 according to one or more secure wireless communication protocols or WLAN protocols, such as portions or all of the Wired Equivalent Privacy (WEP) protocol, the Robust Security Network (RSN) associated with the IEEE 802.11i protocol, the IEEE 802.1x protocol, the Advanced Encryption Standard (AES), the Temporal Key Integrity Protocol (TKIP), Extensible Authentication Protocol over LAN (EAPOL) algorithms or protocols (such as EAP-TTLS, PEAP, or CISCO's LEAP or EAP-FAST protocols, for example), WiFi Protected Access (WPA) protocol, WiFi Protected Access Pre-shared key (WPA-PSK) protocol, WiFi Protected Access Version 2 (WPA2) protocol, or WiFi Protected Access Version 2 Pre-shared key (WPA2-PSK) protocol, for example.

Managing device 18 represents any device suitable to manage channel allocation for devices, such as wireless network device 14, in a wireless network. Although FIG. 1A provides one example of managing device 18 as operating within network 12, in other embodiments managing device 18 may operate as a wireless device connecting to network 12 through a wireless network device 14. Additional details of one example of managing device 18 are described in more detail below.

In various embodiments of the invention, a wireless network may have devices, such as wireless network device 14, communicating over channels using any suitable protocol A channel may refer to a communication link with a specific frequency band. For example, wireless network device 14 may adhere to the IEEE 802.11 standards, and communicate in the 2.4 gigahertz (GHz) frequency band. As the wireless network grows in size, devices operating on adjacent channels may overlap and cause interference with each other.

According to one embodiment of the invention, a system and method are provided that manage channel allocation for devices in a wireless network. This is effected by assigning channels, by a managing device, to devices in a channel pattern. A channel pattern refers to any systematic arrangement of channels in a wireless network to avoid channel interference. Assigning channels, by a managing device, in a channel pattern simplifies wireless network setup, and adjusts channel settings to reduce or eliminate interference from other devices. Additional details of example embodiments of the invention are described in greater detail below in conjunction with portions of FIG. 1A, FIG. 1B, FIG. 2A, FIG. 2B, and FIG. 3.

According to the illustrated embodiment of the invention, managing device 18 includes a processor 20, a storage device 22, an input device 24, a memory device 26, a communication interface 28, an output device 30, and a channel allocation manager 40.

Processor 20 may refer to any suitable device operable to execute instructions and manipulate data to perform operations for managing device 18. Processor 22 may include, for example, any type of central processing unit (CPU).

Storage device 22 may refer to any suitable device operable for storing data and instructions. Storage device 22 may include, for example, a magnetic disk, flash memory, or optical disk, or other suitable data storage device.

Input device 24 may refer to any suitable device operable to input, select, and/or manipulate various data and information. Input device 24 may include, for example, a keyboard, mouse, graphics tablet, joystick, light pen, microphone, scanner, or other suitable input device.

Memory device 26 may refer to any suitable device operable to store and facilitate retrieval of data, and may comprise Random Access Memory (RAM), Read Only Memory (ROM), a magnetic drive, a disk drive, a Compact Disk (CD) drive, a Digital Video Disk (DVD) drive, removable media storage, any other suitable data storage medium, or a combination of any of the preceding.

Communication interface 28 may refer to any suitable device operable to receive input for managing device 18, send output from managing device 18, perform suitable processing of the input or output or both, communicate to other devices, or any combination of the preceding. Communication interface 28 may include appropriate hardware (e.g. modem, network interface card, etc.) and software, including protocol conversion and data processing capabilities, to communicate through a LAN, WAN, or other communication system that allows managing device 18 to communicate to other devices. Communication interface 28 may include one or more ports, conversion software, or both.

Output device 30 may refer to any suitable device operable for displaying information to a user. Output device 30 may include, for example, a video display, a printer, a plotter, or other suitable output device.

Channel allocation manager 40 may refer to any suitable logic embodied in computer-readable media, and when executed, that is operable to allocate channels to devices in a channel pattern. In the illustrated embodiment of the invention, channel allocation manager 40 resides in storage device 22. In other embodiments of the invention, channel allocation manager 40 may reside in memory device 26, or any other suitable device operable to store and facilitate retrieval of data and instructions.

Figure 1B:
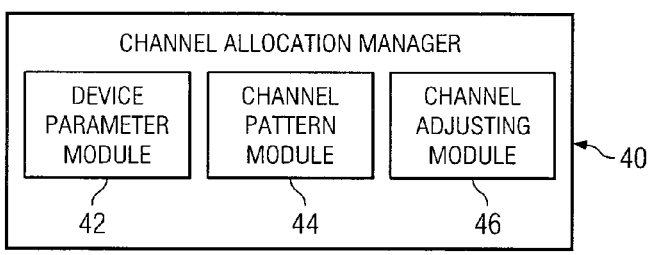
FIG. 1B is a block diagram illustrating an example channel allocation manager of the system of FIG. 1A in accordance with an embodiment of the present invention.

FIG. 1B is a block diagram illustrating an example channel allocation manager 40 of system 10 of FIG. 1A in accordance with an embodiment of the present invention Channel allocation manager 40 may include various modules operable to perform various functions, including a device parameter module 42, a channel pattern module 44, and a channel adjusting module 46.

According to one embodiment of the invention, device parameter module 42 may retrieve wireless network device parameters from wireless network device 14. For example, device parameter module 42 may retrieve a channel from wireless network device 14 as a device parameter. For example, wireless network device 14 may communicate with endpoint device 16 using a channel defined in the IEEE 802.11 standards, such as the 802.11b, 802.11g, and 802.11a standards. The 802.11b/802.11g standards operate in the unlicensed 2.4 gigahertz (GHz) band. The 802.11b/802.11g standards divide the band into 14 overlapping, staggered channels with center frequencies that are 5 megahertz (MHz) apart.

The 802.11b/802.11g standards specify the central frequency of each channel and a spectral mask for each channel. The spectral mask for the 802.11b/802.11g standards may require that the signal be at least 30 dB down from its peak energy at ±11 MHz from the center frequency and at least 50 decibels (dB) down from its peak energy at ±22 MHz from the center frequency. For example, Table 1 describes such channels from the 802.11b/802.11g standards, as well as a corresponding frequency.

TABLE 1

Sample Channel Data

| Channel Identifier | Central Frequency (in MHz)channel |
|---|---|
| 1 | 2412 |
| 2 | 2417 |
| 3 | 2422 |
| 4 | 2427 |
| 5 | 2432 |
| 6 | 2437 |
| 7 | 2442 |
| 8 | 2447 |
| 9 | 2452 |
| 10 | 2457 |
| 11 | 2462 |
| 12 | 2467 |
| 13 | 2472 |
| 14 | 2484 |

As another example, wireless network device 14 may communicate with endpoint device 16 using a channel defined in the 802.11a standard. The 802.11a standard operates in the 5 GHz band. The band is divided into 12 non-overlapping channels. Eight of the channels are dedicated to indoor use, and four of the channels are dedicated to point-to-point use. The 802.11a standard uses an orthogonal frequency-division multiplexing (OFDM) process with 52 subcarriers. Forty-eight subcarriers are data subcarriers, and 4 subcarriers are pilot subcarriers with a carrier separation of 0.3125 MHz (20 MHz/64). The total bandwidth is 20 MHz with an occupied bandwidth of 16.6 MHz.

As another example, wireless network device 14 may communicate with endpoint device 16 using one the following three Unlicensed National Information Infrastructure (UNNI) channel bands:

Lower: 36, 40, 44, 48 at 40 milliwatts;
Middle: 52, 56, 60, 64 at 200 milliwatts; and
Upper: 149, 153, 157, 161 at 800 milliwatts.

The upper channel band may be reserved for outdoor applications, and the middle and lower channel bands may be reserved for indoor use. In general, wireless network device 14 may communicate over different designated channels, and endpoint device 16 communicates with wireless network device 14 over its designated channel. The present disclosure contemplates many types of channels for wireless communication between wireless network device 14 and endpoint device 16. Various embodiments may include some, all, or none of the enumerated channels.

Device parameter module 42 may retrieve a location of wireless network device 14 as a device parameter, according to one embodiment of the invention. The location of wireless network device 14 may be, for example, defined in terms of grid points, with x and y coordinates, selected with a step of 1 starting from 0. The width of the location of the wireless network may be along the x-direction and the length along the y-direction. In other embodiments, the location of wireless network device 14 may be defined in terms of a physical location of wireless network device 14 in a geographic area, such as a single building, a level of a building, a room on a level, related units in the room, other suitable geographic areas, or any combination of the preceding.

Channel pattern module 44 may determine a channel pattern in the wireless network based on the location of wireless network device 14, according to one embodiment of the invention. For example, at the location of wireless network device 14, channels in the wireless network may be allocated in a channel pattern five channels apart. Therefore, for channels defined in the 802.11b/802.11g standards, channel pattern module 44 may determine that channel 2, 7, and 12 may be used to reduce channel interference problems.

As another example, at the location of wireless network device 14, channels in the wireless network may be allocated in a channel pattern four channels apart. Therefore, for channels defined in the 802.11b/802.11g standards, channel pattern module 44 may determine that channel 1, 5, 9, and 14 may be used to reduce channel interference problems.

As another example, at the location of wireless network device 14, channels in the wireless network may be allocated in a channel pattern with predetermined channels. Therefore, for channels defined in the 802.11b/802.11g standards, channel pattern module 44 may determine that channel 1, 4, 8, and 12 may be used to reduce channel interference problems. However, the present disclosure contemplates many types of channel patterns for wireless communication between wireless network device 14 and endpoint device 16. Various embodiments may include some, all, or none of the enumerated channel patterns.

Channel pattern module 44 may identify other devices operating in proximity to wireless network device 14. According to one embodiment, channel pattern module 44 may send probe signals over different channels to identify other devices within the coverage area of wireless network device 14. The probe signal may be sent using any suitable communication technique, for example, a unicast technique. According to another embodiment, channel pattern module 44 may retrieve a location, in the same coordinate system as wireless network device 14, from other devices in the wireless network. Thus, channel pattern module 44 may identify devices in proximity to wireless network device 14, and retrieve a channel from each of the devices.

Channel pattern module 44 may monitor a list of available channels in the wireless network. For example, channel pattern module 44 may identify channels from other devices operating in proximity to wireless network device 14, determine a channel pattern, and store the available channels in the channel pattern in a list. The list of available channels may be stored in any suitable configurable data repository on computer readable media, such as storage device 22.

Channel adjusting module 46 may adjust the channel of wireless network device 14 based on the generated list of available channels, according to one embodiment of the invention. For example, channel pattern module 44 may identify channels from other devices operating in proximity to wireless network device 14, and determine a channel pattern whereby channel 1, 4, 8, and 12 may be used to reduce interference problems. Channel pattern module 44 may also identify that channel 1 and 8 are not available, because channel 1 and 8 are used by devices in proximity to wireless network device 14. Therefore, channel adjusting module 46 may adjust the channel of wireless network device 14 to channel 4.

According to one embodiment of the invention, channel adjusting module 46 may adjust channels by an agent on wireless network device 14. An agent may be any suitable logic operable to adjust the channel on wireless network device 14 according to instructions given by channel adjusting module 46. In other embodiments, channel adjusting module 46 may communicate with wireless network device 14 using other protocols, thereby allowing third-party software agents and hardware devices to be managed.

Figure 2A:
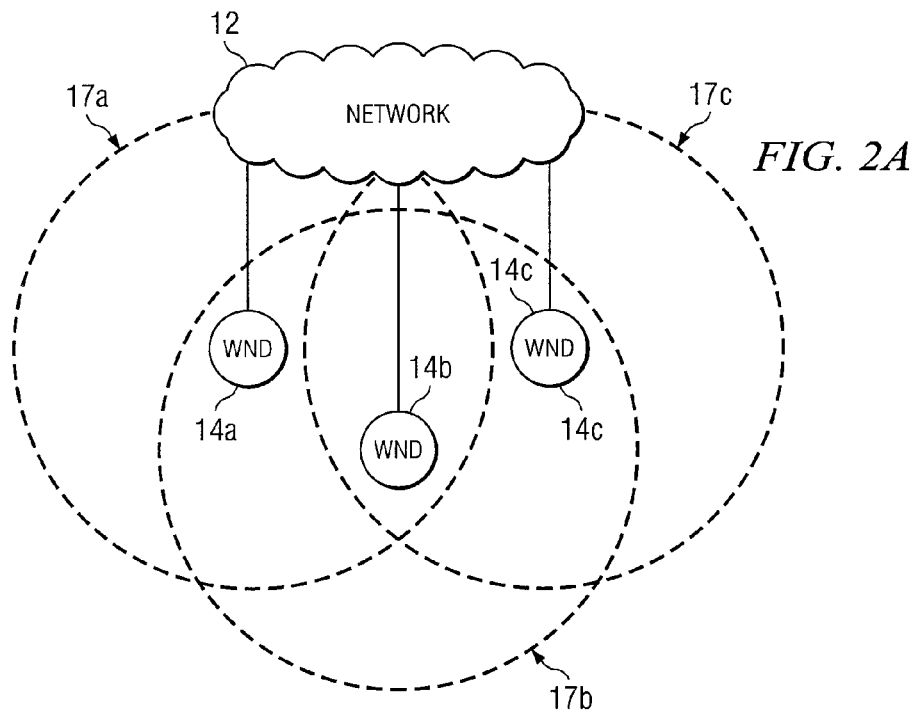
FIG. 2A is a block diagram illustrating an example wireless network coverage area of the system of FIG. 1A, according to an embodiment of the invention.

FIG. 2A is a block diagram illustrating an example wireless network coverage area of system 10 of FIG. 1A, according to an embodiment of the invention. As shown in FIG. 2A, wireless network devices 14*a*, 14*b*, and 14*c* are connected to network 12. Wireless network devices 14*a*, 14*b*, and 14*c* may be substantially similar to wireless network device 14 of FIG. 1A. Wireless network devices 14*a*, 14*b*, and 14*c* each have wireless network ranges 17*a*, 17*b*, and 17*c*, respectively. Wireless network ranges 17*a*, 17*b*, and 17*c* may be substantially similar to wireless network range 17 of FIG. 1A.

Figure 2B:
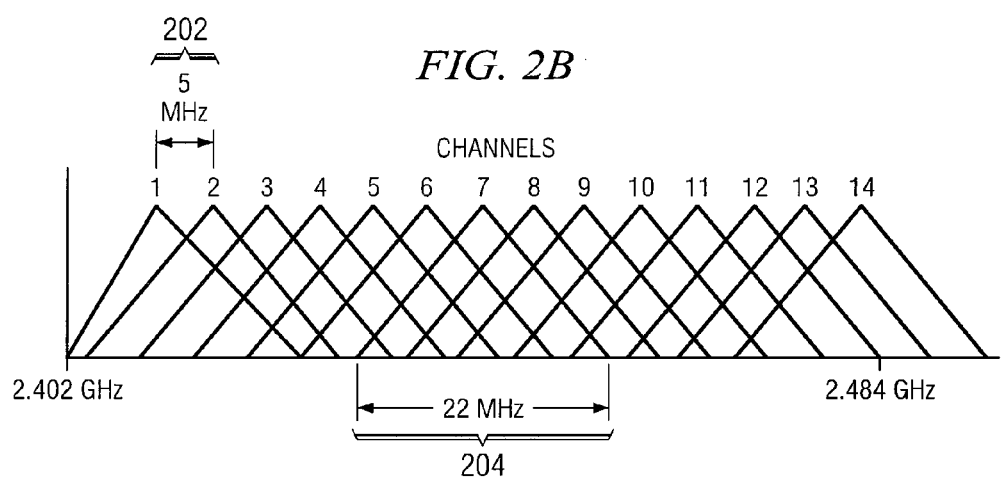
FIG. 2B is a diagram illustrating example wireless network channels that may be used in conjunction with the teachings of the present invention.

FIG. 2B is a diagram illustrating example wireless network channels that may be used in conjunction with the teachings of the present invention. As shown in FIG. 2B, channels from the 2.4-GHz band are broken down into 14 channels. These channels have a center frequency separation of 5 MHz, as indicated by reference number 202, and an overall channel bandwidth (or frequency occupation) of 22 MHz, as indicated by reference number 204. The level of energy that crosses between these channels may cause interference. Also, channel frequencies may not have an exact edge, and energy spreads beyond the edges of the channel frequency boundaries. However, the overall energy level drops as the signal spreads farther from the center of the channel.

According to one embodiment of the invention, the channels of each of wireless network devices 14*a*, 14*b*, 14*c* may be adjusted to reduce interference caused by overlapping wireless network ranges 17*a*, 17*b*, and 17*c*. For example, in a wireless network using the 802.11b/802.11g standards, wireless network device 14*a* may communicate over channel 1 and wireless network device 14*b* may communicate over channel 4. Therefore, the channel of wireless network device 14*c* may be adjusted to communicate over channel 8 to reduce interference with wireless network device 14*a* and 14*b*.

As another example, in a wireless network using the 802.11b/802.11g standards, and where wireless network devices communicate in a pattern five channels apart, wireless network device 14*a* may communicate over channel 2 and wireless network device 14*b* may communicate over channel 7. Therefore, the channel of wireless network device 14*c* may be adjusted to communicate over channel 12 to reduce interference with wireless network device 14*a* and 14*b*. Additionally, the present disclosure contemplates many types of channel allocations for wireless network devices 14 overlapping wireless network ranges. Various embodiments may include some, all, or none of the enumerated channel allocations.

FIG. 3 is a flow chart illustrating example acts associated with a method for managing channels in a wireless network. The example acts may be performed by channel allocation manager 40, as discussed above with reference to FIG. 1A and FIG. 1B. At step 302, device parameters may be retrieved from a wireless network device in the network. In particular embodiments of the invention, the retrieved device parameters may include a parameter indicative of a location of the device. The location of the device may be defined in terms of x and y coordinates in a grid system. Other embodiments may include, for example, a parameter indicative of the channel of the wireless network device.

At step 304, a channel pattern is determined by the channel allocation system. In particular embodiments of the invention, the wireless network may be allocated in a channel pattern with predetermined channels. For example, for channels defined in the 802.11b/802.11g standards, channel 1, 4, 8, and 12 may be used to reduce channel interference problems.

At step 306, a list of available channels is generated for the wireless network. In particular embodiments of the invention, channels from other devices operating in proximity to a the wireless network device may be identified along with a channel pattern, and the available channels in the channel pattern may be stored in a list. The list of available channels may be stored, for example, in any suitable configurable data repository.

At step 308, the channel on which the wireless network device should communicate may be specified based on the generated list of available channels. In particular embodiments of the invention, a list of available channels may be generated for the wireless network. For example, channel 1 and 8 may not be available, because channel 1 and 8 are used by devices in proximity to the wireless network device. Therefore, the channel of the wireless network device may be specified to channel 4. Specifying channel settings to avoid channels that overlap may reduce the effects of channel interference problems.

Although the present invention has been described in several embodiments, a myriad of changes, variations, alterations, transformations, and modifications may be suggested to one skilled in the art, and it is intended that the present invention encompass such changes, variations, alterations, transformations, and modifications as falling within the spirit and scope of the appended claims.

What is claimed is:

1. A method for managing channels in a wireless network, comprising:

retrieving, by a managing device, a plurality of device parameters from a wireless network device communicating on a channel in the wireless network, the device parameters comprising a parameter indicative of a location of the wireless network device and a parameter indicative of the channel on which the wireless network device is communicating, the channel on which the wireless network device is communicating associated with a data transmission frequency;

identifying, by the managing device, a physical location of the wireless network device based on the parameter indicative of the location of the wireless network device;

generating, by the managing device, a list of available channels for the wireless network device by determining a channel pattern in the wireless network based on the identified physical location of the wireless network device, the channel pattern comprising a systematic arrangement of channels; and specifying, by the managing device, the channel on which the wireless network device should communicate based on the generated list of available channels to reduce channel interference to the wireless network device.

2. The method of claim 1, wherein generating, by the managing device, a list of available channels for the wireless network device by determining a channel pattern in the wireless network further comprises:

identifying, by the managing device, one or more devices operating in proximity to the wireless network device based on the parameter indicative of the location of the wireless network device; and retrieving, by the managing device, a respective channel from each of the one or more wireless network devices operating in proximity to the wireless network device.

3. The method of claim 1, wherein determining a channel pattern comprises determining a channel pattern of wireless network devices communicating four channels apart.

4. The method of claim 1, wherein determining a channel pattern comprises determining a channel pattern of wireless network devices communicating five channels apart.

5. The method of claim 1, wherein generating, by the managing device, a list of available channels for the wireless network device by determining a channel pattern in the wireless network further comprises monitoring, by the managing device, a plurality of available channels in the wireless network.

6. The method of claim 1, wherein the data transmission frequency operates on a 2.4 GHz frequency band.

7. The method of claim 1, wherein the wireless network device operates in accordance with an Institute of Electrical and Electronics Engineers (IEEE) 802.11 standard.

8. The method of claim 1, further comprising adjusting the channel in response to specification by the managing device.

9. The method of claim 1, wherein the parameter indicative of a location of the wireless network device is a parameter indicative of a physical location of the wireless network device in a geographic area.

10. A system for managing channels in a wireless network, comprising:
   a wireless network, the wireless network comprising one or more wireless network devices; and
   a managing device operable to connect to the wireless network, the managing device comprising:
   a non-transitory storage device readable by the managing device, embodying a program of instructions executable by a processor to perform acts for managing channels in a wireless network, the acts comprising:
   retrieving a plurality of device parameters from a wireless network device communicating on a channel in the wireless network, the device parameters comprising a parameter indicative of a location of the wireless network device and a parameter indicative of the channel on which the wireless network device is communicating, the channel on which the wireless network device is communicating associated with a data transmission frequency;
   identifying a physical location of the wireless network device based on the parameter indicative of the location of the wireless network device;
   generating a list of available channels for the wireless network device by determining a channel pattern in the wireless network based on the identified physical location of the wireless network device, the channel pattern comprising a systematic arrangement of channels; and
   specifying the channel on which the wireless network device should communicate based on the generated list of available channels to reduce channel interference to the wireless network device.

11. The system of claim 10, wherein act of generating a list of available channels for the wireless network device by determining a channel pattern in the wireless network further comprises the acts of:
   identifying one or more devices operating in proximity to the wireless network device based on the parameter indicative of the location of the wireless network device; and
   retrieving a respective channel from each of the one or more wireless network devices operating in proximity to the wireless network device.

12. The system of claim 10, wherein the act of determining a channel pattern comprises the act of determining a channel pattern of wireless network devices communicating four channels apart.

13. The system of claim 10, wherein the act of determining a channel pattern comprises the act of determining a channel pattern of wireless network devices communicating five channels apart.

14. The system of claim 10, wherein the act of generating a list of available channels for the wireless network device by determining a channel pattern in the wireless network further comprises the act of monitoring a plurality of available channels in the wireless network.

15. The system of claim 10, wherein the data transmission frequency operates on a 2.4 GHz frequency band.

16. The system of claim 10, wherein the wireless network device operates in accordance with an Institute of Electrical and Electronics Engineers (IEEE) 802.11 standard.

17. The system of claim 10, further comprising the act of adjusting the channel in response to specification by the managing device.

18. The system of claim 10, wherein the parameter indicative of a location of the wireless network device is a parameter indicative of a physical location of the wireless network device in a geographic area.

19. A managing device comprising logic encoded in non-transitory computer readable media, the logic being operable, when executed on a processor, to:
   retrieve, by a managing device, a plurality of device parameters from a wireless network device communicating on a channel in the wireless network, the device parameters comprising a parameter indicative of a location of the wireless network device and a parameter indicative of the channel on which the wireless network device is communicating, the channel on which the wireless network device is communicating associated with a data transmission frequency;
   identify, by the managing device, a physical location of the wireless network device based on the parameter indicative of the location of the wireless network device;
   generate, by the managing device, a list of available channels for the wireless network device by determining a channel pattern in the wireless network based on the identified physical location of the wireless network device, the channel pattern comprising a systematic arrangement of channels; and
   specify, by the managing device, the channel on which the wireless network device should communicate based on the generated list of available channels to reduce channel interference to the wireless network device.

20. The managing device of claim 19, wherein the logic operable to generate, by the managing device, a list of available channels for the wireless network device by determining a channel pattern in the wireless network is further operable to:
   identifying, by the managing device, one or more devices operating in proximity to the wireless network device based on the parameter indicative of the location of the wireless network device; and
   retrieving, by the managing device, a respective channel from each of the one or more wireless network devices operating in proximity to the wireless network device.

21. The managing device of claim 19, wherein the logic operable determine a channel pattern comprises the logic operable to determine a channel pattern of wireless network devices communicating four channels apart.

22. The managing device of claim 19, wherein the logic operable determine a channel pattern comprises the logic operable to determine a channel pattern of wireless network devices communicating five channels apart.

23. The managing device of claim 19, wherein the logic operable to generate, by the managing device, a list of available channels for the wireless network device by determining a channel pattern in the wireless network further comprises the logic operable to monitor, by the managing device, a plurality of available channels in the wireless network.

24. The managing device of claim 19, wherein the data transmission frequency operates on a 2.4 GHz frequency band.

25. The managing device of claim 19, wherein the wireless network operates in accordance with an Institute of Electrical and Electronics Engineers (IEEE) 802.11 standard.

26. The managing device of claim 19, further comprising the logic operable to adjust the channel in response to specification by the managing device.

27. The managing device of claim 19, wherein the parameter indicative of a location of the wireless network device is a parameter indicative of a physical location of the wireless network device in a geographic area.

* * * * *